(12) United States Patent
Tanner

(10) Patent No.: US 10,142,633 B2
(45) Date of Patent: Nov. 27, 2018

(54) FLEXIBLE CODING UNIT ORDERING AND BLOCK SIZING

(71) Applicant: INTEL CORPORATION, Santa Clara, CA (US)

(72) Inventor: Jason Tanner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 15/387,186

(22) Filed: Dec. 21, 2016

(65) Prior Publication Data

US 2018/0176565 A1 Jun. 21, 2018

(51) Int. Cl.
*H04N 19/124* (2014.01)
*H04N 19/139* (2014.01)
*H04N 19/147* (2014.01)
*H04N 19/176* (2014.01)

(52) U.S. Cl.
CPC ......... *H04N 19/124* (2014.11); *H04N 19/139* (2014.11); *H04N 19/147* (2014.11); *H04N 19/176* (2014.11)

(58) Field of Classification Search
None
See application file for complete search history.

(56) References Cited

U.S. PATENT DOCUMENTS

| | | | | |
|---|---|---|---|---|
| 2007/0121728 A1* | 5/2007 | Wang | ................... | H04N 19/563 |
| | | | | 375/240.18 |
| 2009/0219991 A1* | 9/2009 | Po | ........................ | H04N 19/176 |
| | | | | 375/240.02 |
| 2013/0003829 A1* | 1/2013 | Misra | ..................... | H04N 19/91 |
| | | | | 375/240.12 |
| 2013/0266072 A1 | 10/2013 | Lee et al. | | |
| 2015/0092840 A1* | 4/2015 | Mochizuki | ........... | H04N 19/593 |
| | | | | 375/240.03 |

FOREIGN PATENT DOCUMENTS

| | | |
|---|---|---|
| CN | 103918270 A | 7/2014 |
| EP | 2761870 A4 | 3/2016 |
| JP | 2014529256 A | 10/2014 |
| JP | 5905582 B2 | 4/2016 |
| TW | 201328360 A | 7/2013 |
| TW | I517677 B | 1/2016 |
| WO | 2013048482 A1 | 4/2013 |

* cited by examiner

*Primary Examiner* — Mohammad J Rahman
(74) *Attorney, Agent, or Firm* — International IP Law Group, P.L.L.C.

(57) ABSTRACT

A method for flexible encoding is described herein. The method includes selecting a largest coding unit size of a current frame based on a largest coding unit size of a prior frame and determining a coding unit processing order based on heuristics and the largest coding unit size of the current frame. The method also includes determining a rate distortion metric of the current frame based on the largest coding unit size and in response to an exit criteria being met, processing the coding units of the current frame in the coding unit processing order.

24 Claims, 5 Drawing Sheets

200

300

FLEXIBLE CODING UNIT ORDERING AND BLOCK SIZING

BACKGROUND ART

Video compression techniques enable video streams to be encoded in order to reduce the image redundancy contained in the video streams. The encoder may compress video streams so that more information can be sent over a given bandwidth or saved in a given file size. The compressed signal or file may be transmitted to a receiver or video decoder that may decode or decompress the signal or file for rendering on a display. The encoding/decoding may be performed according to a particular video compression standard. For example, video compression standards include the H.264/MPEG-4 Advanced Video Coding (AVC) standard, the High Efficiency Video Coding (HEVC) standard, and the VP9 standard.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
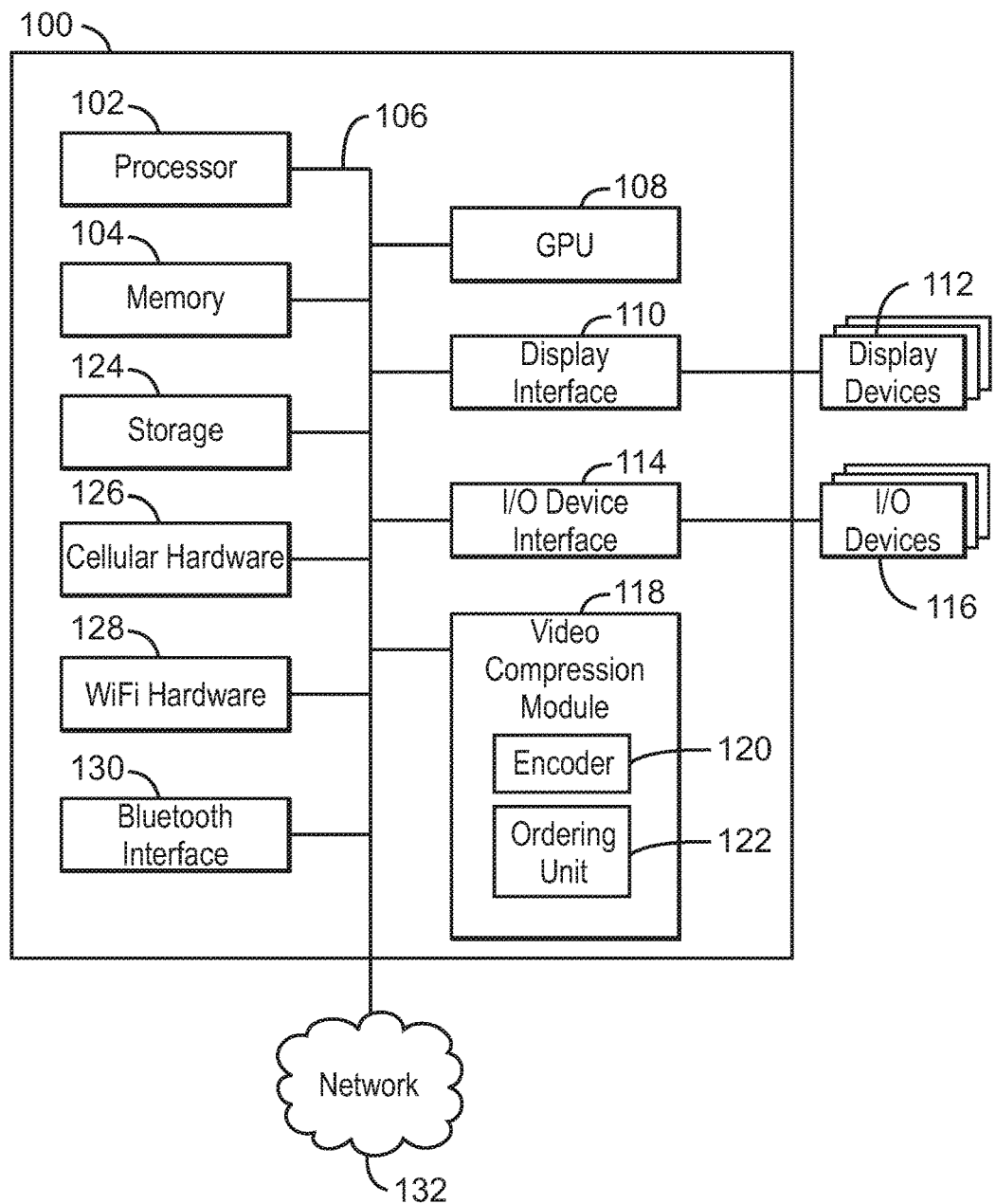
FIG. 1 is a block diagram of an exemplary system that enables flexible coding unit ordering.

Most video standards include similar basic functions, such as intra/inter prediction, transform, quantization, in-loop filtering, and entropy coding when encoding video data streams. Each video frame may be divided into a number of macroblocks or coding units to be encoded. For example, the H.264 standard may divide each frame into a number of 16×16 macroblocks while the HEVC standard may divide the frame into units up to 64×64 coding units. Often, the macroblock or coding unit is further divided into partitions of various sizes throughout the frame based on the image content. As used herein, the size of the macroblock or coding unit is given in pixel To support all possible partition sizes and to find an optimal combination and ordering of partitions, a video encoder may evaluate an encoding cost of all possible partitioning options, resulting in an extremely high computational complexity. As used herein, the encoding cost may include the number of clock cycles used for encoding, as well as the number of processing cores used during the encoding. For such advanced video coding standards, each macro block or coding unit may use a transform size that is N×N or smaller, where N is the coding unit size. As a result, in addition to the complexity due to determining each partition size, the transform size determination may further increase the number of possible decisions and therefore computational complexity during encoding. Further, coding units, macroblocks, or portions may be encoded from largest to smallest, which may result in an extremely high computational complexity during encoding.

Embodiments described herein enable flexible coding unit ordering. In embodiments, all block sizes may be checked to determine a plurality of coding shapes for a frame of a video stream based on a lowest rate distortion of the plurality of coding shapes. A processing order of the plurality of shapes may be adaptively determined, wherein the processing order is based on a QP, complex heuristics, and prior frame processing. In response to meeting an exit criteria, ceasing processing of each respective coding shape.

In making an encoding mode decision, the number of different possible encoding decisions is very high. For example, the encoding modes may include determining the inter-prediction or intra-prediction for each possible macroblock size. The macroblock sizes are dictated by the particular coding standard being used. Checking each would be cumbersome for performance. The present techniques relate to adaptively changing the processing order and enabling of features to get further performance enhancement while minimizing the impact to quality.

In embodiments, the present techniques include a selective enabling and disabling of shapes. After shapes are selected, the present techniques may selectively order how shapes are processed and determine when such processing is finished. For example, the present techniques can determine how to selectively start the process of video encoding with a smaller size versus a larger size, and then how to start at the top for bottom-down processing of each block size.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an exemplary system that enables flexible coding unit ordering. The electronic device 100 may be, for example, a laptop computer, tablet computer, mobile phone, smart phone, or a wearable device, among others. The electronic device 100 may be used to receive and render media such as images and videos. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, streaming data, or the like, to be rendered or displayed to a user of the electronic device 100. In some embodiments, the GPU 108 includes a number of graphics engines, wherein each graphics engine is configured to perform specific graphics tasks, or to execute specific types of workloads.

The CPU 102 can be linked through the bus 106 to a display interface 110 configured to connect the electronic device 100 to one or more display devices 112. The display devices 112 can include a display screen that is a built-in component of the electronic device 100. In embodiments, the display interface 110 is coupled with the display devices 112 via any networking technology such as cellular hardware 126, Wifi hardware 128, or Bluetooth Interface 130 across the network 132. The display devices 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100. Accordingly, in embodiments, the I/O device interface 114 is coupled with the I/O devices 116 via any networking technology such as cellular hardware 126, Wifi hardware 128, or Bluetooth Interface 130 across the network 132. The I/O devices 116 can also include any I/O device that is externally connected to the electronic device 100.

A video compression module 118 may be used to compress video data. The video data may be stored to a file or rendered on a display device. The video compression module may include an encoder 120 and an ordering unit 122. The encoder 120 is to encode video data or a video stream by at least generating a bit stream from the video data that complies with the requirements of a particular standard. Generating the encoded bit stream includes making mode decisions for each a block. As used herein, a block or portion is a sequence of pixels horizontally and vertically sampled. The block, portion, or partition may also refer to the coding unit or macroblock used during encoding. The mode refers to a type of compression applied to each block, such as an intra-prediction, inter-prediction, and the like.

In particular, video encoding involves dividing a frame into smaller blocks (coding units or macroblocks). Each of those blocks can be divided into different sizes and have different modes. Typically, an encoder will process each block with the same operations and the encoding begins with the largest block (e.g. 2N×2N or 64×64 for HEVC) and continues until it has processed the smallest block size. Changing the block size is done to improve the compression efficiency by using different modes or motion vectors for the smaller blocks instead of a larger block with one mode and/or motion vector. The tradeoff when changing the block size is the quality of the resulting bitstream and the size of the bitstream relative to the quality. Also, the more block sizes that are checked to determine the best starting block size, the longer the encoding process takes depending on the hardware functionality.

Various video standards may be used according to the present techniques. Exemplary standards include the H.264/MPEG-4 Advanced Video Coding (AVC) standard developed by the ITU-T Video Coding Experts Group (VCEG) with the ISO/IEC JTC1 Moving Picture Experts Group (MPEG), first completed in May 2003 with several revisions and extensions added to date. Another exemplary standard is the, the High Efficiency Video Coding (HEVC) standard developed by the same organizations with the second version completed and approved in 2014 and published in early 2015. A third exemplary standard is the VP9 standard, initially released on Dec. 13, 2012 by Google.

The ordering unit 122 applies heuristics to optimize the encoding process. The ordering unit 122 may initially determine the dependencies used during encoding based on the content of each frame at the macroblock level. As used herein, dependencies refer to the between spatially adjacent coding units to derive predicted motion vectors (or merge candidates) as well as intra most probable modes. For example, algorithms for compressing frames differ by the amount of data provided to specify the image contained within the frame. For example, the frames may be specified during compression using intra-coded frames (I-frames), predicted picture frames (P-frames) and bi-directional predicted picture frames (B-frames). As used herein, specified refers to the data that is saved for each frame during compression. An I-frame is fully specified. A P-frame is specified by saving the changes that occur in each frame when compared to the previous frame, while a B-frame is specified by saving the changes that occur in each frame when compared to both the previous frame and the following frame. Thus, P- and B-frames have dependencies on other frames. The present techniques enable content adaptive dependencies. The ordering unit also enables dynamic coding unit/macroblock size ordering.

The computing device 100 may also include a storage 124. The storage device 124 is a physical memory such as a hard drive, an optical drive, a flash drive, an array of drives, or any combinations thereof. The storage device 124 can store user data, such as audio files, video files, audio/video files, and picture files, among others. The storage device 124 can also store programming code such as device drivers, software applications, operating systems, and the like. The programming code stored to the storage device 124 may be executed by the CPU 102, GPU 108, or any other processors that may be included in the electronic device 100.

The CPU 102 may be linked through the bus 106 to cellular hardware 126. The cellular hardware 126 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 100 may access any network 132 without being tethered or paired to another device, where the cellular hardware 126 enables access to the network 132.

The CPU 102 may also be linked through the bus 106 to WiFi hardware 128. The WiFi hardware 128 is hardware according to WiFi standards (standards promulgated as Institute of Electrical and Electronics Engineers' (IEEE) 802.11 standards). The WiFi hardware 128 enables the electronic device 100 to connect to the Internet using the Transmission Control Protocol and the Internet Protocol (TCP/IP). Accordingly, the electronic device 100 can enable end-to-end connectivity with the Internet by addressing, routing, transmitting, and receiving data according to the TCP/IP protocol without the use of another device. Additionally, a Bluetooth Interface 130 may be coupled to the CPU 102 through the bus 106. The Bluetooth Interface 130 is an interface according to Bluetooth networks (based on the Bluetooth standard promulgated by the Bluetooth Special Interest Group). The Bluetooth Interface 130 enables the electronic device 100 to be paired with other Bluetooth enabled devices through a personal area network (PAN). Accordingly, the network 132 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Compression modules, such as video compression module 118 (FIG. 1), can encode each video frame by dividing each video frame into macro blocks or coding units. A macroblock may consist of 16×16 samples, and is further subdivided into transform blocks, and may be further subdivided into prediction blocks. In embodiments, the prediction blocks may be variable in size. Each variable size macroblock or coding unit may be separately encoded based on a different prediction mode. Each transform block may be encoded into a bitstream. The bitstream may be a standards compliant bitstream, such as AVC, HEVC, V9, or the like. For example, residuals associated with the portion of the video frame may be quantized and transformed based on a selected transform size. The resultant transform coefficients and other data such as mode selection data, motion vector residuals, if applicable, transform size indicators, or the like may be entropy encoded into the bitstream. Typically, an encoder will process each block with the same operations and it starts from the largest block (e.g. 2N×2N or 64×64 for HEVC) and continues until it has processed the smallest block size.

Figure 2:
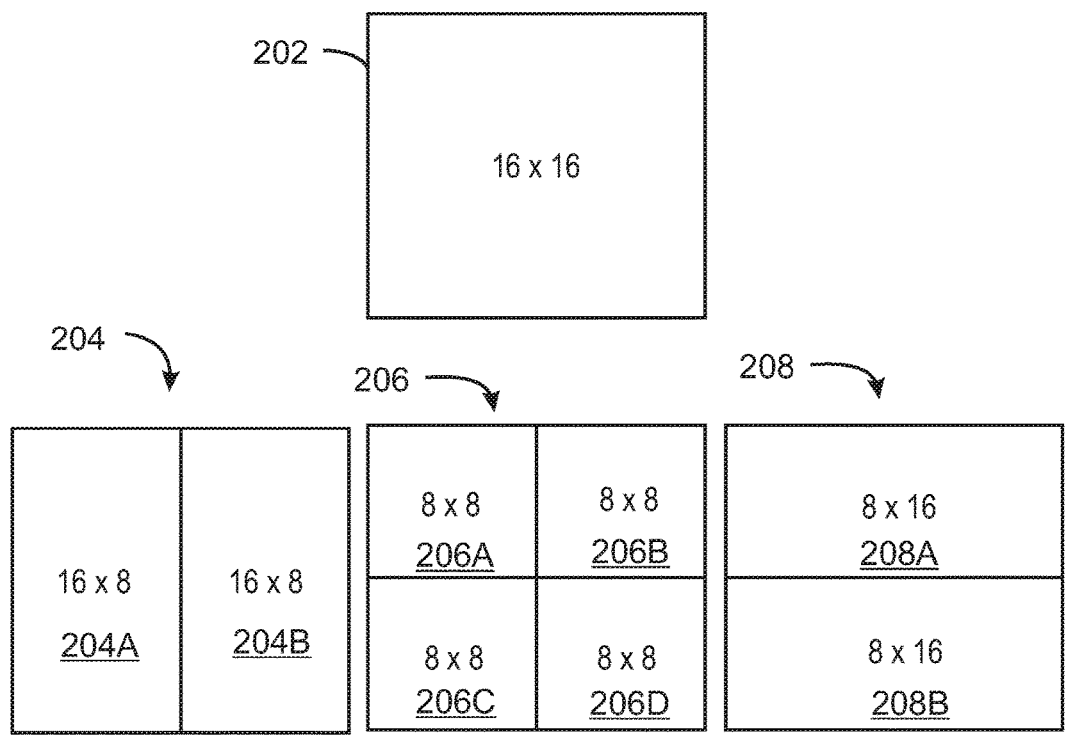
FIG. 2 is a block diagram of a macroblock and a number of macroblock partitions.
Figure 2:
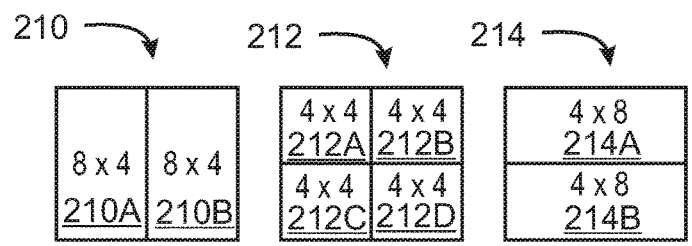

FIG. 2 is a block diagram of a macroblock and a number of macroblock partitions. As shown in FIG. 2, in the context of AVC, a macroblock 202 may be 16×16 pixels. Also as shown, macroblock 202 may be partitioned for coding into macroblock partitions 204, 206, and 208. For example, the macroblock partition 204 may have two macroblock partitions 204A and 204B each having a size of 16×8 pixels. Macroblock partitions 206 may have four macroblock partitions 206A, 206B, 206C, and 206D, each having a size of 8×8 pixels. The macroblock partitions 208 may have two macroblock partitions 208A and 208B each having a size of 8×16 pixels as shown.

Furthermore, each of the four partitions 206A, 206B, 206C, and 206D of macroblock partitions 206 may be further partitioned into macroblock partitions 210, 212, and 214. In the example of FIG. 2, only one further partitioning is shown for the sake of clarity, however each of the four partitions 206A, 206B, 206C, and 206D of macroblock partitions 206 may be further partitions as illustrated with respect to macroblock partitions 210, 212, and 214. As shown, macroblock partitions 210 may have two macroblock partitions each having a size of 8×4 pixels, macroblock partitions 212 may have four macroblock partitions each having a size of 4×4 pixels, and macroblock partitions 214 may have two macroblock partitions each having a size of 4×8 pixels. While the macroblocks are illustrated as fixed sizes, the division of the macroblocks may vary. The variable sized marcroblock partitions may be blocks of pixels that share a common prediction mode such as motion vectors, reference frame index, reference prediction mode, or the like for coding.

In the context of High Efficiency Video Coding (HEVC), the HEVC standard defines a coding tree unit (CTU) for a picture (e.g., a video frame of a video sequence) that may be partitioned into coding units (coding units) that take the form of rectangular blocks having variable sizes. The size of the coding tree unit may be selected by the encoder and may typically have a size of 64×64 pixels.

Most encoders begin processing from the largest coding unit to the smallest coding unit. If a skip is detected at a larger coding unit size, then no smaller coding unit would be checked as coding for that particular unit will not improve over the larger coding unit skip. A skip may be described as a mode where no information is encoded due to no change or a change below a threshold between the previous coding unit and the next coding unit. In particular, neither motion vectors nor residuals as encoded in a skip mode. Additionally, during encoding, if a distortion metric for a smaller coding unit begins to exceed the distortion of the larger coding unit, encoding is terminated as an option as the larger coding unit can be selected as the first coding unit size to be encoded. A distortion metric may be a rate distortion metric to improve video quality during video compression. In embodiments, the distortion metric measures a deviation from the source material and the bit cost for each possible decision outcome. In examples, a sum of absolute differences (SAD) or a sum of absolute transformed differences (SATD) may be a metric for the distortion, and various costings may be applied for mode type and size costings. In the present techniques, distortion and cost are used to derive an optimal decision. In embodiments, an estimate of the discrete cosine transform (DCT) may be used to determine distortion.

The present techniques do not use the typical largest coding unit to smallest coding unit ordering. Rather, the present techniques vary the ordering of the processing based on various heuristics to optimize the performance. If processing in a reverse order, an early exit criteria based on the number of larger coding units that were selected for processing compared to the smaller coding units is used to stop processing larger blocks. Additionally, the amount of parallelization can be limited based on the largest block size that is processed (larger blocks give smaller wavefronts and vice versa). As used herein, a wave front represents how many coding units can run in parallel based on a compute unit configuration.

For example, when using a 32×32 coding unit size, approximately 272 coding units may be run in parallel. Assuming 4 k pixels with a resolution of 3096×2160, there are 2160 rows of pixels. A diagonal in the 2160 rows of pixels would be a maximum of 2160/32 coding units, or approximately 68 coding units running in parallel. If 16×16 is selected as the largest coding unit size, then the result is 135 units executing in parallel. The other direction (going to larger blocks for processing instead of smaller blocks) results in block of size 64×64 with 34 of these large blocks running in parallel.

Running such a large amount of coding units in parallel represents huge improvement over techniques that cannot run as many units in parallel. In particular, by running a large amount of coding units in parallel, there is time to pre-fetch the reference blocks, where the pre-fetch is hidden in the background while each block is being processed. A large amount of work can be queued to keep the pipeline fed and running efficiently. In some cases, dependencies between blocks prevent all blocks from running in parallel. For example, when a 64×64 block of data is processed, the processing may consume 5000 clock cycles, and processing each 32×32 block takes 1000 clock cycles. Assuming unlimited hardware units, when processing for 10,000 clock cycles, the first 64×64 block would have enough clock cycles to complete processing. The dependency between blocks is on the block above, above left, and to the left (and sometimes above right). With processing of the 64×64 block complete, the blocks to the right and the block below can now be processed. Accordingly, in 10,000 clock cycles, three 64×64 blocks could be completely processed. However, if only 32×32 blocks are processed, it will take less time because a decision for 64×64 block processing is not made (consider that 4*32×32 coding units of 1000 clock cycles each is 4000 clock cycles instead of 5000 clock cycles for one 64×64 coding unit). But also, after 1000 clock cycles, coding units down and to the right can begin processing so the two are executing in parallel. Then, at t=2000 clock cycles, three more 32×32 coding units are executing. At t=3000 clock cycles, four more 32×32 coding units are executing. Then five and six coding units at 4000 and 5000 clock cycles, respectively. Thus, before 10 k clock cycles are reached, 15 32×32 coding units have been processed compared to three 64×64 coding units (which is twelve 32×32 coding units).

Thus, significant performance gains are obtained by limiting the largest block size to obtain greater parallelization. This is commonly fixed at run time for a sequence depending on the desired performance. The present techniques makes a parallelization size determination adaptive based on the content of each frame, macroblock/coding unit in order to maintain high performance while minimally impacting video quality.

During encoding, generally it is ideal that encoders check all the possible block sizes. Checking the block sizes refers to determining if processing the block size represents the lowest encoding cost of the frame. Checking the block sizes enables a determination of a maximum block size and how it can be advantageous to performance to cap the largest size to less than the absolute largest size. The maximum number of blocks that can be processed in parallel depends on the size of the largest block (while maintaining dependencies between blocks). To determine the predicted motion vector or merge candidates for each block, the blocks are processed only after the dependent blocks have been completely processed. If the maximum block size is N×N instead of 2N×2N, twice as many blocks can be processed in parallel.

The frequency of different block sizes in the final partitioning depends, at least in part, on a quantizer value of the blocks and the content. A quantizer refers to a function that enables the quantization that occurs to map pixel values from the original frame to the pixel values in the compressed frame. The quantization parameter (QP) or quantizer value may be a value that indicates the many-to-few mapping. A large quantizer will not produce fine details in the resulting video stream, and can create visual artifacts while producing a very small bitstream. By contrast, a small quantizer gives good details in the resulting video stream while producing a large bitstream. Rate control algorithms typically use the smallest quantizer possible according to the link conditions to transmit the video. With a small quantizer, the use of content to determine block size will produce larger blocks in flat regions and smaller blocks in more detailed regions. A flat region refers to a portion or group of blocks with static content. However, with a small quantizer, the largest block sizes (2N×2N) are only used on the most basic content. With the larger quantizer, the largest blocks (2N×2N) are used much more frequently and the smallest blocks more rarely. The present techniques optimize the ordering of the block size and determining the maximum size supported dynamically to optimize both for performance and for quality. Both block size and block ordering can be applied on a per frame basis or at a lower level coding unit basis. For simplicity, the present techniques are described on a per frame basis.

Figure 3:
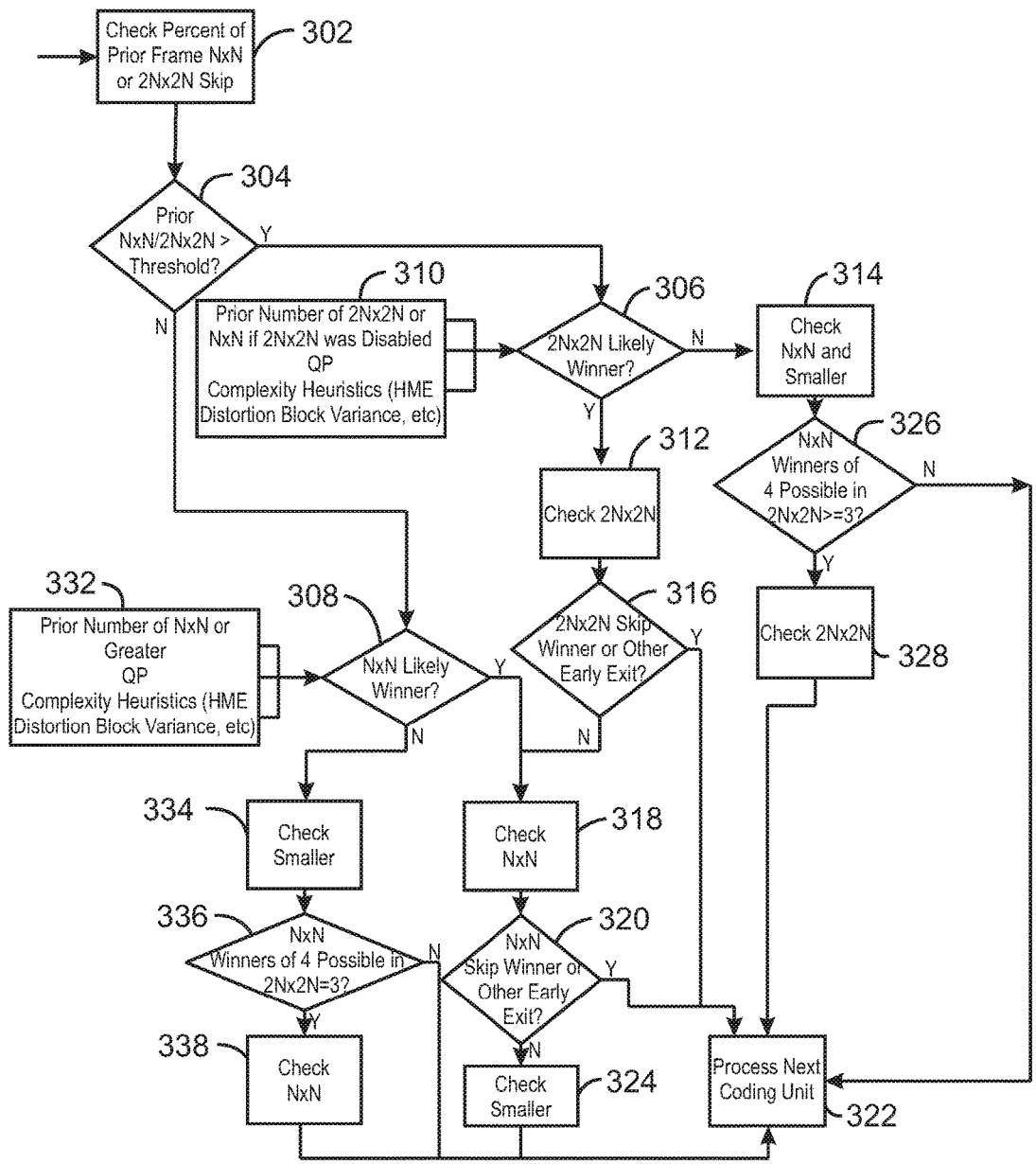
FIG. 3 is a block diagram of a method 300 for flexible coding unit ordering.

FIG. 3 is a block diagram of a method 300 for flexible coding unit ordering. In FIG. 3, before a frame (frame M)

begins processing, the prior frame (frame M-1) stores statistics related to its results. Those statistics are the block and frame level hierarchical distortion, the number of 2N×2N (if any) coding units, the number of N×N encoding units, the number of N×N/2N×2N skips, among others. The prior frame also ran at a known quantization.

At block 302, the percent of prior frame N×N or 2N×2N skips is checked. At block 304, if the percent of prior N×N or 2N×2N skips are greater than a threshold, process flow continues to block 306. If the percent of prior N×N or 2N×2N skips are less than or equal to a threshold, process flow continues to block 308.

At block 306, it is determined if a coding unit size of 2N×2N is to be selected as the largest coding unit size. This selection or winning determination may be used to dynamically order the coding unit's size. To determine the likely coding unit size winner, at block 310 the prior number of 2N×2N (or N×N if 2N×2N was disabled) and a quantization parameter are used to determine the likely winner. Additionally, complexity heuristics are used to determine the likely winner. Complexity heuristics include hierarchical motion estimation (HME), distortion, block variance, and the like. Thus, coding unit size selection is determined based on the QP of the prior frame, the number of N×N and 2N×2N winners/skips of the prior frame. Other metrics like the HME distortion metrics can be used as well. If 2N×2N is the likely winner, process flow continues to block 312. If 2N×2N is not the likely winner, process flow continues to block 314.

At block 312, 2N×2N is checked to determine the likely coding unit size winner for processing. If 2N×2N passes the check, at block 316, a 2N×2N skip winner or other early exit is determined. Here, a determination is made that may cause an exit from the dynamic coding unit size ordering. If the skip, winner, or early exit is determined, process flow continues to block 320. If the skip, winner, or early exit is not determined, process flow continues to block 318. At block 318, the next smaller coding unit size N×N is checked in order to determine if size N×N will be used as the initial coding size. If N×N passes the check, at block 320, N×N skip winner or other early exit is determined. If the skip, winner, or early exit is determined, process flow continues to block 322. If the skip, winner, or early exit is not determined, process flow continues to block 324. At block 324, a smaller block is checked. At block 322, the next coding unit or macro block is processed and the method 300 begins again. In particular, process flow returns to block 302 to process the next coding unit.

At block 306, it is determined if 2N×2N is the likely winner. If 2N×2N is the likely winner, process flow continues to block 312. If 2N×2N is not the likely winner, process flow continues to block 314. At block 314, coding unit size N×N and smaller is checked. At block 326, N×N winners of 4 possible 2N×2N>=3 are determined. At block 326, a decision is made on if 2N×2N block sizes will be checked at all. Note that in the process of FIG. 3, there are two separate processes executing. The first is determining the largest shape supported, and the second is determining the order the shapes will be processed on a block by block basis. At block 326, the block ordering here is referring to 2N×2N block sizes being enabled, but unlikely to win based on heuristics. Thus, the smaller shapes are checked first. If all the blocks happen to be the largest size up until that point (N×N), then the 2N×2N blocks are checked. However, if there are several N/2×N/2 blocks or other sizes N×N/2, then it is less likely there will be a 2N×2N block winner. If the motion vectors are far away between the N×N blocks, the value of 3 at block 326 may be set at 4 or motion vector difference may be taken into account. The heuristics will provide a guess or estimate of what block size might win, but making the block decision of the current block gives the best information to make a more accurate decision on if that block size should be skipped. Thus, if N×N winners of 4 possible 2N×2N>=3 are determined, process flow continues to block 328. If N×N winners of 4 possible 2N×2N>=3 are not determined, process flow continues to block 322. At block 328, N×N is checked. If N×N passes the check, at block 322, the next coding unit or macro block is processed.

Returning to block 304, if the percent of prior N×N or 2N×2N skips are greater than a threshold, process flow continues to block 306. If the percent of prior N×N or 2N×2N skips are less than or equal to a threshold, process flow continues to block 308. At block 308, it is determined if the N×N coding unit size is the likely winner as discussed above. To determine the likely winner, at block 332 the prior number of N×N or greater and QP are used to determine the likely winner. Additionally, complexity heuristics are used to determine the likely winner. Again, complexity heuristics include HME, distortion, block variance, and etc. If N×N is the likely winner, process flow continues to block 318 where N×N is checked. If N×N is not the likely winner, process flow continues to block 334. At block 334, a smaller block is checked. If smaller passes the check, at block 336, N×N skip winners of 4 possible 2N×2N>=3 are determined. If N×N winners of 4 possible 2N×2N>=3 are determined, process flow continues to block 338. If N×N winners of 4 possible 2N×2N>=3 are not determined, process flow continues to block 322. At block 338, N×N is checked. If N×N passes the check, at block 322, the next coding unit or macro block is processed.

As mentioned above, a heuristic approach is used to select the block sizes for each frame to be encoded. Additionally, the prior number of N×N or greater blocks used to encode the previous frame and QP are used to determine the likely winner. As used herein, the winner refers to the starting block size selected based on the prior number of N×N or greater blocks, QP, and complexity heuristics. As illustrated in FIG. 3, blocks 310 and 332 are used to apply various heuristics to the coding unit size ordering.

In embodiments, a low QP results in sacrificing a bit of precision when dividing the frame into coding units to improve the quality of the bit stream in the frequency domain. By contrast, a high QP is used to render details of the video very sharply using a lot of points and coefficients. However, to render a smooth video, less coefficients can be used when step sizes are used in terms of the quantization framework. In this manner, when a low QP setting is used, block sizes tend to be small resulting in a large bit stream with lots of coefficients. With a low QP, a large initial block size like 64×64 is typically not used. When a really high QP is used (for example, with a maximum value of 50) much larger block sizes tend to be used during encoding. However, the block sizes depend very much on the content, even with really simple content at a low QP, large blocks may occur as a result of the similar content.

Accordingly, determining block sizes uses more than just a QP value as depending solely on the QP may result in sacrificing a large amount of coding efficiency when the video stream data becomes simple. Thus, the present techniques can use frame content, heuristics, and statistics from the previous frame to determine an order a block size. Moreover, the present techniques enable a performance optimized result all while maintaining really good video quality. In embodiments, the present techniques track (frame-to-frame for each block) if frame results tend to stay the same. The QP results may be used to keep a quantizer within a fairly narrow band even with wide steps in quantization.

Heuristics from the prior frame may be used along with QP values. The type of modes and block sizes from the previous frame may provide statistics to be used to processing the current frame. The mode refers to inter-prediction, intra-prediction, skips, and the like that are used to encode each block according to a particular standard. Considering block sizes includes determining the block sizes used to encode the previous frame. For example, the present techniques may consider if the previous frame produced a large number of 32×32 block sizes, skips, 16×16 block sizes, as well as what kind of a dominant block shape occurs in the previous frame and the what type of distortion occurred in the previous frame.

To process the current frame, a quantization target is typically available to be used across the frame and shapes can be selectively enabled or disabled based on the prior frame. Assume that a prior frame did not produce any 64×64 blocks, and approximately 10% of the blocks being 32×32 with the remaining 90% of the blocks smaller than 32×32. When the next frame is processed, 64×64 block sizes and 32×32 are not checked for rate distortion and the resulting encoding cost. Instead, 16×16 blocks are checked for a rate distortion and then only after 16×16 is done will the present techniques will decide whether 32×32 block sizes should be checked. Thus, the present techniques enable each block to be analyzed in terms of what the current rate distortion is or what was the shape decision for the previous frame was.

Thus, the present techniques can dynamically adjust the checked block sizes and the ordering of the block sizes that are checked for optimal encoding based on historical data. As used herein, checking the block sizes refers to determining a rate distortion for each block shape. The selected block shape is the block that has the lowest rate distortion. There is a cost associated with rate distortion. A smaller rate distortion results in a better quality bit stream for encoding, but a higher rate distortion uses fewer blocks for encoding. There is an optimization point between the two where an optimized rate distortion is selected.

Additional heuristics include modes used during encoding such as intra-prediction, inter-prediction, and skip. A skip is a special mode of inter-coding that copies from the previous frame and it drives the motion from the prior frames. Put another way, from the neighboring blocks, during skip mode the prediction it drives its own motion vector. Other heuristics include pre-processing steps such as HME statistics, variance, and the prior probabilities that are analyzed determine a likelihood of particular block size winning. The present techniques can use these pre-processing to infer what should be done ahead of time when encoding each frame. Another important piece during encoding is the ability to scale the quantization.

In particular, with HME used as a heuristic, the content of each frame is searched, prior knowledge of what should be done is provided based on the HME. For example, each block may be downscaled by a factor or four, and then downscaled again by another factor of four. The search is performed on the downscaled, lower resolutions for a certain block size and the next resolution up can be searched. This results in a forward scale up whatever motion found. When the final resolution is obtained, computations are more of a localized refinement based on what the hierarchical motion predicted instead of searching the frame. In embodiments, scaling can be done in line. Additionally, in embodiments, scaling can be done on a frame basis before the full resolution is processed. The entire frame may be down scaled two or three times. Each layer is then searched to get motion vectors only. The smallest layer feeds forward to the next largest layer and so on. Then the full resolution is searched and an inter/intra decision is made and an optimized motion vector decision is made.

Once the heuristics and other data is obtained, the processing order of the block sizes can be determined. For example, if distortions and motion vectors are known, the processing order can be inferred for an individual block. If a block zero is targeted for being first on the processing order and has a very low distortion based on HME, it can be assumed that the block will likely be a large shape. Block zero has a very low distortion, but if the next block has more distortion it can be determined based on the QP and the type of content with this distortion, that the next block would be a smaller block. This correlation between shape, size, and frame-to-frame distortion enables content adaptive ordering and better ordering decisions. In embodiments, accordingly ordering the blocks based on HME statistics and the like is an additional layer on top of the initial block size determination in ordering. Put another way, the present techniques can determine an order of processing within a current frame based on what happened in the prior frames. Heuristics are described herein that enables each frame to be processed according to the content resulting in a content adaptive frame to frame processing.

Figure 4:
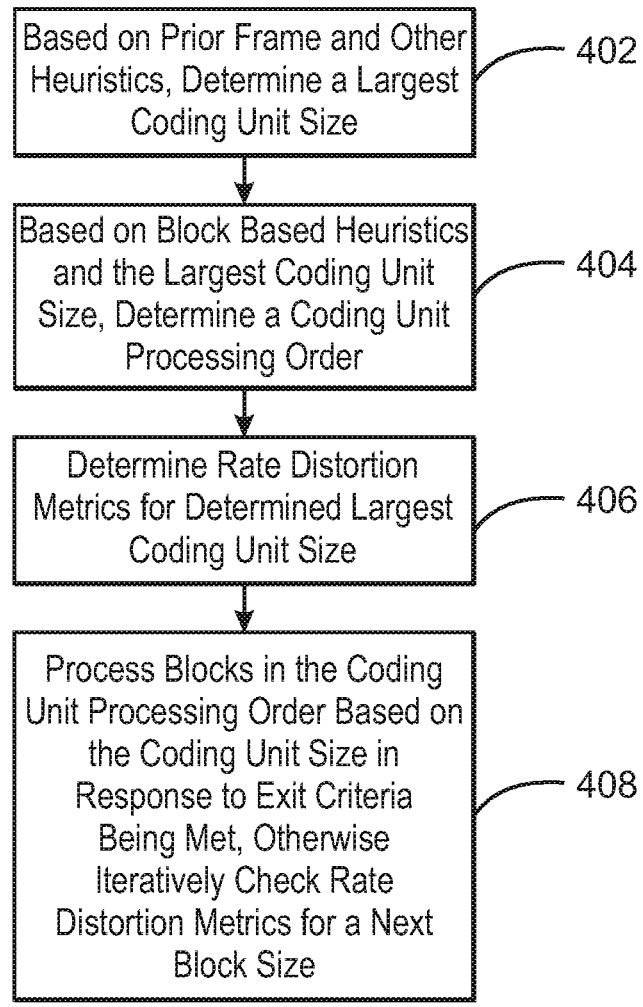
FIG. 4 is a process flow diagram of a method for flexible encoding.

FIG. 4 is a process flow diagram of a method for flexible encoding. At block 402, a largest coding unit size is determined based on a prior frame. In particular, the largest coding unit size may be based on the coding unit sizes of the prior frame. At block 404, a coding unit processing order is determined based on block based heuristics and the largest coding unit size. The processing order may be determined based on the dynamic coding unit ordering, where the processing order of the plurality of coding shapes is adaptively determined. The processing order may be based on a QP, complex heuristics, and prior frame processing. In the present techniques, dynamic coding unit size ordering analyzes the QP, HME stats, variance, prior probabilities to determine the likelihood of a particular block size winning (either at a frame level or at a per coding unit level, here it is assumed that the same flow will be used for all coding units for simplicity). For example, if the given context of the next frame the result is most likely to be a 32×32 (and for purpose of discussion, assume that the 64×64 coding shape is enabled), the processing would skip the 64×64 block size and start checking the 32×32 block size first. Each 32×32 block size is checked for being a skip, and integer and fractional searches are also performed. In embodiments, a full integer pixel search is first performed, and a fractional pixel refinement of that search is done to blend between the pixels. For example, if a motion vector is ¼ distance it means ¾ of pixel 0 will be blended with ¼ of pixel.

For example, there are four 32×32 block shapes inside of a 64×64 block shape. Any of those 32×32 block shapes that result in a skip result (no coefficients) will bypass the smaller shapes as they will only take more bits to write all the mode and won't result in a quality improvement. But if they aren't a skip and have a higher distortion, the smaller shapes will be checked. Once all four 32×32s are done being checked, a decision will be made if processing the 64×64 block shape should occur. If N of the four 32×32 block shape results were smaller block shapes, the 64×64 block shape will be bypassed in the encoding. Also, analyzing the cohesion or how similar the motion vectors are can also be used in addition to how many of the results are the 32×32 block shape as well as how similar the smaller shape distortion was compared to the 32×32 block shape distortion. This results in a speedup over traditional top down searching since the largest shape will often be bypassed when it is known to not be very likely the best result.

For a high quality mode of the encoder, the largest coding unit (2N×2N) is always enabled. For complicated content, it results in a 20% performance impact without offering much benefit in terms of compression. As used herein, complicated content refers to content with a high amount of movement. With the dynamic ordering, the performance impact disappears and the compression impact is negligible.

At block 406, rate distortion metrics are determined for the largest coding unit size. In embodiments, the rate distortion and changes in the QP may be used to determine the coding shapes based on content adaptive block shape determination. In content adaptive block shape determination, frame M decides for the entire frame if it will use 64×64 dependencies or 32×32 dependencies for encoding. The 32×32 gives greater parallelization, but depending on the content this block size selection can hurt the video quality and quantizer. In embodiments, Frame M may use a different quantizer than Frame M-1. The number of 32×32/64×64 etc., blocks are scaled based on the difference in the quantizer. The scaling can be a fixed scaling or tracking the change in scaling relative to the content and prior changes in QP. Based on the prior coding unit sizes and the new quantizer as well as the distortions, a decision is made to enable or disable 64×64 (2N×2N). Similarly, if this was performed at a block level other coding unit sizes could be enabled/disabled. Using the prior frame results and the quantizer to adjust the block sizes enables the adaption of selecting and disabling the larger coding unit sizes to be done adaptively according to the content.

In the high speed mode of the encoder, typically the 2N×2N shape would be disabled often for performance purposes. With the present techniques, the 2N×2N shapes can be enabled adaptively. If the content is simple and results in lots of skips at the 32×32 block size, the present techniques will enable checking the 64×64 block size. This could be at low, medium, or high QP for simple content. This adaptive block sizing gives a significant compression benefit for that content. At a high QP, mostly all content benefits from the use of the 2N×2N shape. Enabling the 2N×2N shape gives a compression benefit of greater than 20% on a fair amount of content at high QP. However, the larger shape will be disabled at low QP which takes up to 20% of the processing time. In addition to the processing time, the decrease in parallelization results in an even larger performance impact that can be 50% slower for smaller clips like 720 p and 20% slower for UHD.

At block 408, blocks are processed in the determined coding unit processing order based on the coding unit size in response to an exit criteria being met. Otherwise, rate distortion metrics are iteratively checked for a next block size. The next block size may be smaller or larger than the current block size, depending on the determined coding unit processing order. Determining the rate distortion enables all current block sizes to be checked to determine the lowest encoding costs associated with each block. The rate distortion may be used to determine if the frame will include 2N×2N dependencies or N×N dependencies as discussed above.

The exit criteria may include finding a skip or winning coding shape, among others. Exit criteria also includes finding a best rate distortion metric. The current rate distortion metric for the selected block size and processing order may be compared to a current rate distortion metric, and the search for the best block size and processing order terminates if it exceeds the current best. In embodiments, a threshold may be checked as an exit criteria versus the rate distortion metric.

Through the combination of content adaptive block sizing and dynamic coding unit size ordering, an approximate 20% or more speed up of video encoding occurs while minimally impacting video quality. Across several sequences, the overall quality impact is about 1% on average and roughly 10% for the worse case. Disabling 64×64 block shape, for instance, would result in good performance gain and the quality impact can be more than 25%, especially for high a QP.

Figure 5:
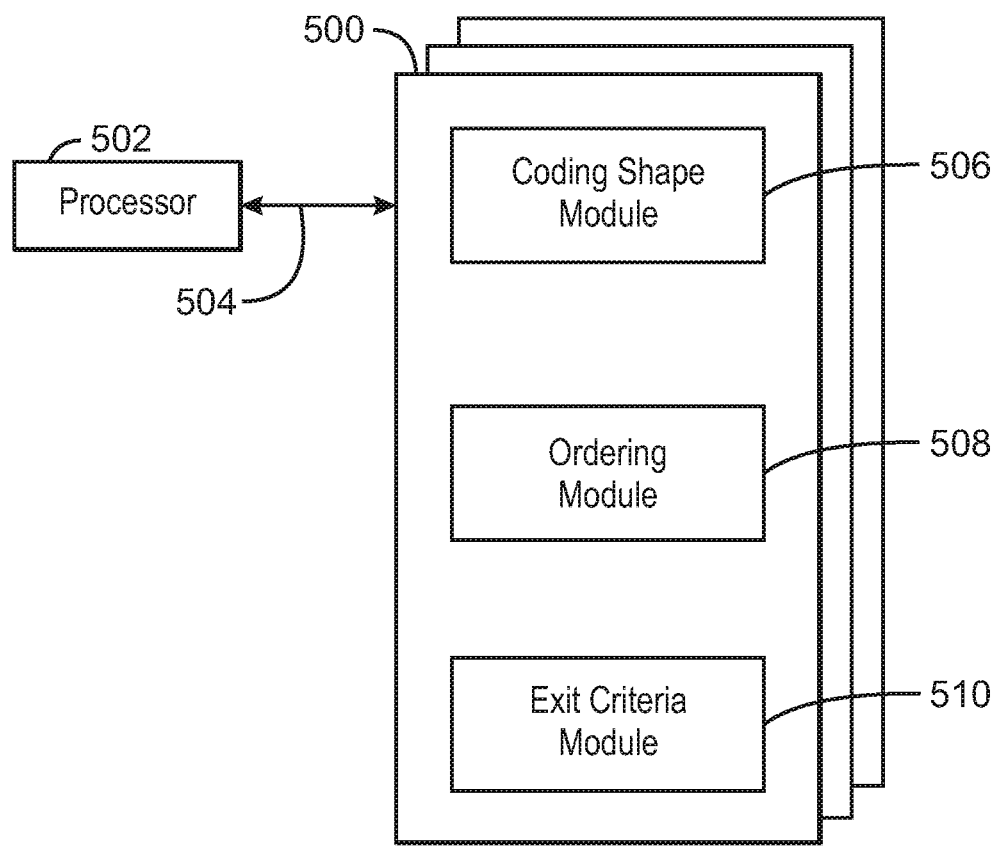
FIG. 5 is a tangible, non-transitory computer readable medium.

FIG. 5 is a tangible, non-transitory computer readable medium. FIG. 5 is a block diagram showing a tangible, non-transitory computer-readable medium 500 that stores code for fast transcode, in accordance with embodiments. The tangible, non-transitory computer-readable medium 500 may be accessed by a processor 502 over a computer bus 504. Furthermore, the tangible, non-transitory computer-readable medium 500 may include code configured to direct the processor 502 to perform the methods described herein.

The various software components discussed herein may be stored on the tangible, non-transitory computer-readable medium 500, as indicated in FIG. 5. For example, a coding shape module 406 may be configured to determine a coding shape size and a decoding shape. An ordering module 508 may be configured to determine a processing order of the coding shapes. Further, an exit criteria module 510 may be configured to determine an exit criteria for the various coding shapes.

The block diagram of FIG. 5 is not intended to indicate that the tangible, non-transitory computer-readable medium 500 is to include all of the components shown in FIG. 5. Further, the tangible, non-transitory computer-readable medium 500 may include any number of additional components not shown in FIG. 5, depending on the details of the specific implementation.

Example 1 is a method for flexible coding unit ordering and block sizing. The method includes selecting a largest coding unit size of a current frame based on a largest coding unit size of a prior frame; determining a coding unit processing order based on heuristics and the largest coding unit size of the current frame; determining a rate distortion metric of the current frame based on the largest coding unit size; and in response to an exit criteria being met, processing the coding units of the current frame in the coding unit processing order.

Example 2 includes the method of example 1, including or excluding optional features. In this example, in response to an exit criteria not being met, iteratively comparing rate distortion metrics for a next coding unit size of a current frame. Optionally, the next coding unit size is determined by the coding unit processing order.

Example 3 includes the method of any one of examples 1 to 2, including or excluding optional features. In this example, the rate distortion metric is to determine a final largest coding unit size.

Example 4 includes the method of any one of examples 1 to 3, including or excluding optional features. In this example, selecting the largest coding unit size is based on, at least in part, a content of the current frame. Optionally, the content of the current frame dictates a quantizer value, and the quantizer and the largest coding unit size of the prior frame are used to select the largest coding unit size.

Example 5 includes the method of any one of examples 1 to 4, including or excluding optional features. In this example, the coding unit processing order is determined using, at least in part, a quantization parameter, heuristics, and the prior frame.

Example 6 includes the method of any one of examples 1 to 5, including or excluding optional features. In this example, the coding unit processing order is determined by analyzing quantization parameters, hierarchical motion estimation statistics, variance, and prior frame probabilities to determine a likelihood of a particular block size being selected for a slot in the coding unit processing order.

Example 7 includes the method of any one of examples 1 to 6, including or excluding optional features. In this example, the coding unit processing order is determined on a block-by-block basis.

Example 8 includes the method of any one of examples 1 to 7, including or excluding optional features. In this example, enabling and disabling larger coding unit sizes is to be done adaptively according to the content.

Example 9 includes the method of any one of examples 1 to 8, including or excluding optional features. In this example, the exit criteria comprises determining if a number of larger coding units were selected for processing is greater than the number of smaller coding units selected for processing.

Example 10 includes the method of any one of examples 1 to 9, including or excluding optional features. In this example, the exit criteria comprises finding a skip or winning coding shape.

Example 11 includes the method of any one of examples 1 to 10, including or excluding optional features. In this example, the largest block size is limited to obtain a higher rate of parallelization during video encoding.

Example 12 is an apparatus for flexible coding unit ordering and block sizing. The apparatus includes a content adaptive block sizing mechanism to a select a largest coding unit size of a current frame based on a largest coding unit size of a prior frame and determine a rate distortion metric of the current frame based on the largest coding unit size; a dynamic coding unit ordering mechanism to determine a coding unit processing order based on heuristics and the largest coding unit size of the current frame; and an exit mechanism that, in response to an exit criteria being met, processes a plurality of coding units of the current frame in the coding unit processing order.

Example 13 includes the apparatus of example 12, including or excluding optional features. In this example, in response to an exit criteria not being met, iteratively comparing rate distortion metrics for a next coding unit size of a current frame. Optionally, the next coding unit size is determined by the coding unit processing order.

Example 14 includes the apparatus of any one of examples 12 to 13, including or excluding optional features. In this example, the rate distortion metric is to determine a final largest coding unit size.

Example 15 includes the apparatus of any one of examples 12 to 14, including or excluding optional features. In this example, selecting the largest coding unit size is based on, at least in part, a content of the current frame. Optionally, the content of the current frame dictates a quantizer value, and the quantizer and the largest coding unit size of the prior frame are used to select the largest coding unit size.

Example 16 includes the apparatus of any one of examples 12 to 15, including or excluding optional features. In this example, selecting the largest coding unit size is based on, at least in part, a content of the current frame wherein static content results in a small quantizer value, and dynamic content results in a larger quantizer value, wherein the quantizer value is used by the content adaptive block sizing mechanism to determine a largest coding unit size.

Example 17 includes the apparatus of any one of examples 12 to 16, including or excluding optional features. In this example, the coding unit processing order is determined using, at least in part, a quantization parameter, heuristics, and the prior frame.

Example 18 includes the apparatus of any one of examples 12 to 17, including or excluding optional features. In this example, the coding unit processing order is determined by analyzing quantization parameters, hierarchical motion estimation statistics, variance, and prior frame probabilities to determine a likelihood of a particular block size being selected for a slot in the coding unit processing order.

Example 19 includes the apparatus of any one of examples 12 to 18, including or excluding optional features. In this example, enabling and disabling larger coding unit sizes is to be done adaptively according to the content.

Example 20 includes the apparatus of any one of examples 12 to 19, including or excluding optional features. In this example, the exit criteria comprises determining if a number of larger coding units were selected for processing is greater than the number of smaller coding units selected for processing.

Example 21 includes the apparatus of any one of examples 12 to 20, including or excluding optional features. In this example, the exit criteria comprises finding a skip or winning coding shape.

Example 22 includes the apparatus of any one of examples 12 to 21, including or excluding optional features. In this example, the largest block size is limited to obtain a higher rate of parallelization during video encoding.

Example 23 is a system for flexible coding unit ordering and block sizing. The system includes a display to render a plurality of frames; a memory that is to store instructions and that is communicatively coupled to the display; and a processor communicatively coupled to the display and the memory, wherein when the processor is to execute the instructions, the processor is to: select a largest coding unit size of a current frame based on a largest coding unit size of a prior frame of the plurality of frames; determine a coding unit processing order based on heuristics and the largest coding unit size of the current frame; determine a rate distortion metric of the current frame based on the largest coding unit size; and in response to an exit criteria being met, process the coding units of the current frame in the coding unit processing order.

Example 24 includes the system of example 23, including or excluding optional features. In this example, in response to an exit criteria not being met, iteratively comparing rate distortion metrics for a next coding unit size of a current frame. Optionally, the next coding unit size is determined by the coding unit processing order.

Example 25 includes the system of any one of examples 23 to 24, including or excluding optional features. In this example, the rate distortion metric is to determine a final largest coding unit size.

Example 26 includes the system of any one of examples 23 to 25, including or excluding optional features. In this example, selecting the largest coding unit size is based on, at least in part, a content of the current frame. Optionally, the content of the current frame dictates a quantizer value, and the quantizer and the largest coding unit size of the prior frame are used to select the largest coding unit size.

Example 27 includes the system of any one of examples 23 to 26, including or excluding optional features. In this example, the coding unit processing order is determined using, at least in part, a quantization parameter, heuristics, and the prior frame.

Example 28 includes the system of any one of examples 23 to 27, including or excluding optional features. In this example, the coding unit processing order is determined by analyzing quantization parameters, hierarchical motion estimation statistics, variance, and prior frame probabilities to determine a likelihood of a particular block size being selected for a slot in the coding unit processing order.

Example 29 includes the system of any one of examples 23 to 28, including or excluding optional features. In this example, the coding unit processing order is determined on a block-by-block basis.

Example 30 includes the system of any one of examples 23 to 29, including or excluding optional features. In this example, enabling and disabling larger coding unit sizes is to be done adaptively according to the content.

Example 31 includes the system of any one of examples 23 to 30, including or excluding optional features. In this example, the exit criteria comprises determining if a number of larger coding units were selected for processing is greater than the number of smaller coding units selected for processing.

Example 32 includes the system of any one of examples 23 to 31, including or excluding optional features. In this example, the exit criteria comprises finding a skip or winning coding shape.

Example 33 includes the system of any one of examples 23 to 32, including or excluding optional features. In this example, the largest block size is limited to obtain a higher rate of parallelization during video encoding.

Example 34 is a tangible, non-transitory, computer-readable medium. The computer-readable medium includes instructions that direct the processor to select a largest coding unit size of a current frame based on a largest coding unit size of a prior frame; determine a coding unit processing order based on heuristics and the largest coding unit size of the current frame; determine a rate distortion metric of the current frame based on the largest coding unit size; and in response to an exit criteria being met, process the coding units of the current frame in the coding unit processing order.

Example 35 includes the computer-readable medium of example 34, including or excluding optional features. In this example, in response to an exit criteria not being met, iteratively comparing rate distortion metrics for a next coding unit size of a current frame. Optionally, the next coding unit size is determined by the coding unit processing order.

Example 36 includes the computer-readable medium of any one of examples 34 to 35, including or excluding optional features. In this example, the rate distortion metric is to determine a final largest coding unit size.

Example 37 includes the computer-readable medium of any one of examples 34 to 36, including or excluding optional features. In this example, selecting the largest coding unit size is based on, at least in part, a content of the current frame. Optionally, the content of the current frame dictates a quantizer value, and the quantizer and the largest coding unit size of the prior frame are used to select the largest coding unit size.

Example 38 includes the computer-readable medium of any one of examples 34 to 37, including or excluding optional features. In this example, the coding unit processing order is determined using, at least in part, a quantization parameter, heuristics, and the prior frame.

Example 39 includes the computer-readable medium of any one of examples 34 to 38, including or excluding optional features. In this example, the coding unit processing order is determined by analyzing quantization parameters, hierarchical motion estimation statistics, variance, and prior frame probabilities to determine a likelihood of a particular block size being selected for a slot in the coding unit processing order.

Example 40 includes the computer-readable medium of any one of examples 34 to 39, including or excluding optional features. In this example, the coding unit processing order is determined on a block-by-block basis.

Example 41 includes the computer-readable medium of any one of examples 34 to 40, including or excluding optional features. In this example, enabling and disabling larger coding unit sizes is to be done adaptively according to the content.

Example 42 includes the computer-readable medium of any one of examples 34 to 41, including or excluding optional features. In this example, the exit criteria comprises determining if a number of larger coding units were selected for processing is greater than the number of smaller coding units selected for processing.

Example 43 includes the computer-readable medium of any one of examples 34 to 42, including or excluding optional features. In this example, the exit criteria comprises finding a skip or winning coding shape.

Example 44 includes the computer-readable medium of any one of examples 34 to 43, including or excluding optional features. In this example, the largest block size is limited to obtain a higher rate of parallelization during video encoding.

Example 45 is an apparatus for flexible coding unit ordering and block sizing. The apparatus includes instructions that direct the processor to a content adaptive block sizing mechanism to a select a largest coding unit size of a current frame based on a largest coding unit size of a prior frame and determine a rate distortion metric of the current frame based on the largest coding unit size; a dynamic coding unit ordering mechanism to determine a coding unit processing order based on heuristics and the largest coding unit size of the current frame; and an exit mechanism that, in response to an exit criteria being met, processes a plurality of coding units of the current frame in the coding unit processing order.

Example 46 includes the apparatus of example 45, including or excluding optional features. In this example, in response to an exit criteria not being met, iteratively comparing rate distortion metrics for a next coding unit size of a current frame. Optionally, the next coding unit size is determined by the coding unit processing order.

Example 47 includes the apparatus of any one of examples 45 to 46, including or excluding optional features. In this example, the rate distortion metric is to determine a final largest coding unit size.

Example 48 includes the apparatus of any one of examples 45 to 47, including or excluding optional features. In this example, selecting the largest coding unit size is based on, at least in part, a content of the current frame. Optionally, the content of the current frame dictates a quantizer value, and the quantizer and the largest coding unit size of the prior frame are used to select the largest coding unit size.

Example 49 includes the apparatus of any one of examples 45 to 48, including or excluding optional features.

In this example, selecting the largest coding unit size is based on, at least in part, a content of the current frame wherein static content results in a small quantizer value, and dynamic content results in a larger quantizer value, wherein the quantizer value is used by the content adaptive block sizing mechanism to determine a largest coding unit size.

Example 50 includes the apparatus of any one of examples 45 to 49, including or excluding optional features. In this example, the coding unit processing order is determined using, at least in part, a quantization parameter, heuristics, and the prior frame.

Example 51 includes the apparatus of any one of examples 45 to 50, including or excluding optional features. In this example, the coding unit processing order is determined by analyzing quantization parameters, hierarchical motion estimation statistics, variance, and prior frame probabilities to determine a likelihood of a particular block size being selected for a slot in the coding unit processing order.

Example 52 includes the apparatus of any one of examples 45 to 51, including or excluding optional features. In this example, enabling and disabling larger coding unit sizes is to be done adaptively according to the content.

Example 53 includes the apparatus of any one of examples 45 to 52, including or excluding optional features. In this example, the exit criteria comprises determining if a number of larger coding units were selected for processing is greater than the number of smaller coding units selected for processing.

Example 54 includes the apparatus of any one of examples 45 to 53, including or excluding optional features. In this example, the exit criteria comprises finding a skip or winning coding shape.

Example 55 includes the apparatus of any one of examples 45 to 54, including or excluding optional features. In this example, the largest block size is limited to obtain a higher rate of parallelization during video encoding.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for flexible coding unit ordering and block sizing, comprising:
   selecting a largest coding unit size of a current frame based on a largest coding unit size of a prior frame;
   determining a coding unit processing order based on heuristics and the largest coding unit size of the current frame;
   determining a rate distortion metric of the current frame based on the largest coding unit size; and
   in response to exit criteria being met, processing the coding units of the current frame in the coding unit processing order.

2. The method of claim 1, wherein in response to the exit criteria not being met, iteratively comparing rate distortion metrics for a next coding unit size of a current frame, and wherein the next coding unit size is determined by the coding unit processing order.

3. The method of claim 1, wherein the rate distortion metric is to determine a final largest coding unit size.

4. The method of claim 1, wherein selecting the largest coding unit size is based on, at least in part, a content of the current frame and the content of the current frame dictates a quantizer value, and the quantizer and the largest coding unit size of the prior frame are used to select the largest coding unit size.

5. The method of claim 1, wherein the coding unit processing order is determined using, at least in part, a quantization parameter, heuristics, and the prior frame.

6. The method of claim 1, wherein the coding unit processing order is determined by analyzing quantization parameters, hierarchical motion estimation statistics, variance, and prior frame probabilities to determine a likelihood of a particular block size being selected for a slot in the coding unit processing order.

7. The method of claim 1, wherein the coding unit processing order is determined on a block-by-block basis.

8. The method of claim 1, wherein enabling and disabling larger coding unit sizes is to be done adaptively according to the content.

9. The method of claim 1, wherein the exit criteria comprise determining if a number of larger coding units were selected for processing is greater than the number of smaller coding units selected for processing.

10. The method of claim 1, wherein the exit criteria comprise finding a skip or winning coding shape.

11. The method of claim 1, wherein the largest block size is limited to obtain a higher rate of parallelization during video encoding.

12. An apparatus for flexible coding unit ordering and block sizing, comprising:
    a content adaptive block sizing mechanism to a select a largest coding unit size of a current frame based on a largest coding unit size of a prior frame and determine a rate distortion metric of the current frame based on the largest coding unit size;
    a dynamic coding unit ordering mechanism to determine a coding unit processing order based on heuristics and the largest coding unit size of the current frame; and
    an exit mechanism that, in response to exit criteria being met, processes a plurality of coding units of the current frame in the coding unit processing order.

13. The apparatus of claim 12, wherein selecting the largest coding unit size is based on, at least in part, a content of the current frame and the content of the current frame dictates a quantizer value, and the quantizer and the largest coding unit size of the prior frame are used to select the largest coding unit size.

14. The apparatus of claim 12, wherein selecting the largest coding unit size is based on, at least in part, a content of the current frame wherein static content results in a small quantizer value, and dynamic content results in a larger quantizer value, wherein the quantizer value is used by the content adaptive block sizing mechanism to determine a largest coding unit size.

15. A system for flexible coding unit ordering and block sizing, comprising:

a display to render a plurality of frames;
a memory that is to store instructions and that is communicatively coupled to the display; and
a processor communicatively coupled to the display and the memory, wherein when the processor is to execute the instructions, the processor is to:
 select a largest coding unit size of a current frame based on a largest coding unit size of a prior frame of the plurality of frames;
 determine a coding unit processing order based on heuristics and the largest coding unit size of the current frame;
 determine a rate distortion metric of the current frame based on the largest coding unit size; and
 in response to exit criteria being met, process the coding units of the current frame in the coding unit processing order.

16. The system of claim 15, wherein in response to the exit criteria not being met, iteratively comparing rate distortion metrics for a next coding unit size of a current frame.

17. The system of claim 15, wherein the rate distortion metric is to determine a final largest coding unit size.

18. The system of claim 15, wherein selecting the largest coding unit size is based on, at least in part, a content of the current frame.

19. A tangible, non-transitory, computer-readable medium comprising instructions that, when executed by a processor, direct the processor to:
 select a largest coding unit size of a current frame based on a largest coding unit size of a prior frame;
 determine a coding unit processing order based on heuristics and the largest coding unit size of the current frame;
 determine a rate distortion metric of the current frame based on the largest coding unit size; and
 in response to exit criteria being met, process the coding units of the current frame in the coding unit processing order.

20. The computer readable medium of claim 19, wherein in response to the exit criteria not being met, iteratively comparing rate distortion metrics for a next coding unit size of a current frame and the next coding unit size is determined by the coding unit processing order.

21. The computer readable medium of claim 19, wherein the rate distortion metric is to determine a final largest coding unit size.

22. The computer readable medium of claim 19, wherein the coding unit processing order is determined by analyzing quantization parameters, hierarchical motion estimation statistics, variance, and prior frame probabilities to determine a likelihood of a particular block size being selected for a slot in the coding unit processing order.

23. The computer readable medium of claim 19, wherein enabling and disabling larger coding unit sizes is to be done adaptively according to the content.

24. The computer readable medium of claim 19, wherein the exit criteria comprise determining if a number of larger coding units were selected for processing is greater than the number of smaller coding units selected for processing.

* * * * *